(12) United States Patent
Faitelson et al.

(10) Patent No.: US 11,487,805 B2
(45) Date of Patent: *Nov. 1, 2022

(54) ON-DEMAND INDEXING

(71) Applicant: VARONIS SYSTEMS, LTD., Herzliya (IL)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, INC., New York, NY (US)

(*) Notice: Subject to any disclaimer, the term of this patent is extended or adjusted under 35 U.S.C. 154(b) by 261 days.

This patent is subject to a terminal disclaimer.

(21) Appl. No.: 17/073,636

(22) Filed: Oct. 19, 2020

(65) Prior Publication Data

US 2021/0034655 A1 Feb. 4, 2021

Related U.S. Application Data

(60) Continuation of application No. 15/806,344, filed on Nov. 8, 2017, now Pat. No. 10,810,247, which is a division of application No. 14/138,068, filed on Dec. 22, 2013, now Pat. No. 9,842,111.

(51) Int. Cl.
  *G06F 16/00* (2019.01)
  *G06F 16/41* (2019.01)
  *G06F 16/13* (2019.01)
  *G06F 16/783* (2019.01)

(52) U.S. Cl.
  CPC ............ *G06F 16/41* (2019.01); *G06F 16/137* (2019.01); *G06F 16/13* (2019.01); *G06F 16/784* (2019.01); *G06F 16/7844* (2019.01)

(58) Field of Classification Search
  CPC ........ G06F 16/41; G06F 16/137; G06F 16/13; G06F 16/784; G06F 16/7844
  See application file for complete search history.

(56) References Cited

U.S. PATENT DOCUMENTS

| 7,818,324 | B1* | 10/2010 | Held | G06F 16/24 |
| | | | | 707/741 |
| 9,842,111 | B2* | 12/2017 | Faitelson | G06F 16/41 |
| 10,810,247 | B2* | 10/2020 | Faitelson | G06F 16/137 |
| 2007/0244865 | A1* | 10/2007 | Gordon | G06F 16/252 |
| 2018/0349463 | A1* | 12/2018 | Bernhardy | G06F 16/213 |
| 2019/0197037 | A1* | 6/2019 | Hartwell | G06F 3/0484 |

* cited by examiner

*Primary Examiner* — Cheryl Lewis
(74) *Attorney, Agent, or Firm* — Soroker Agmon Nordman; Sharone Godesh; Daniel Schatz

(57) ABSTRACT

A method for indexing objects in a computerized system having an index, comprising identifying in the computerized system an at least one indexed object that meets an at least one criterion related to contents of the at least one indexed object, detecting an at least one non-indexed object having a property similar to an at least one property of the at least one indexed object that was identified, and indexing the at least one non-indexed object in the index, wherein the method is performed by the computerized system, and an apparatus for performing the same.

14 Claims, 4 Drawing Sheets

ON-DEMAND INDEXING

CROSS REFERENCE TO RELATED APPLICATIONS

The present application is a continuation of U.S. patent application Ser. No. 15/806,344, filed Nov. 8, 2017, now U.S. Pat. No. 10,810,247 which is a division of U.S. patent application Ser. No. 14/138,068, filed Dec. 22, 2013, now U.S. Pat. No. 9,842,222.

BACKGROUND

The present disclosure generally relates to a search in a computerized system, and more specifically to a search in a computerized system having an index.

Indexing of objects, such as files, of a computerized system is known in the art. In case the computerized system comprises numerous variable objects the indexing may not catch up with the objects. Thus, index-based searches for objects in the computerized system may not be thorough.

SUMMARY

One exemplary embodiment of the disclosed subject matter is a method for indexing objects in a computerized system having an index, comprising identifying in the computerized system an at least one indexed object that meets an at least one criterion related to contents of the at least one indexed object, detecting an at least one non-indexed object having a property similar to an at least one property of the at least one indexed object that was identified, and indexing the at least one non-indexed object in the index, wherein the method is performed by the computerized system.

Another exemplary embodiment of the disclosed subject matter is a method for post-search indexing of objects in a computerized system having an index, comprising searching for indexed objects in the computerized system according to an at least one criterion received from a computer that is linked to the computerized system, identifying in the computerized system an at least one indexed object that meets the at least one criterion, detecting an at least one non-indexed object having a property similar an at least one property of the at least one indexed object, providing the computer with alternatives for choosing either to demand proceeding with indexing of the at least one non-indexed object or to postpone the indexing of the at least one non-indexed object, and receiving a choice from the computer, and according to the choice, performing either indexing of the at least one non-indexed object and providing the computer with a representation thereof, or scheduling for a subsequent indexing the at least one non-indexed object, wherein the method is performed by the computerized system.

Yet another exemplary embodiment of the disclosed subject matter is an apparatus for indexing objects in a computerized system, comprising an at least one computer, an at least one storage device constructed with an index for objects of the computerized system, wherein the at least one computer is constructed with a program configured for identifying in the computerized system an at least one indexed object that meets an at least one criterion related to contents of the at least one indexed object, detecting an at least one non-indexed object having a property similar an at least one property of the at least one indexed object, and indexing the at least one non-indexed object in the index.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1A:
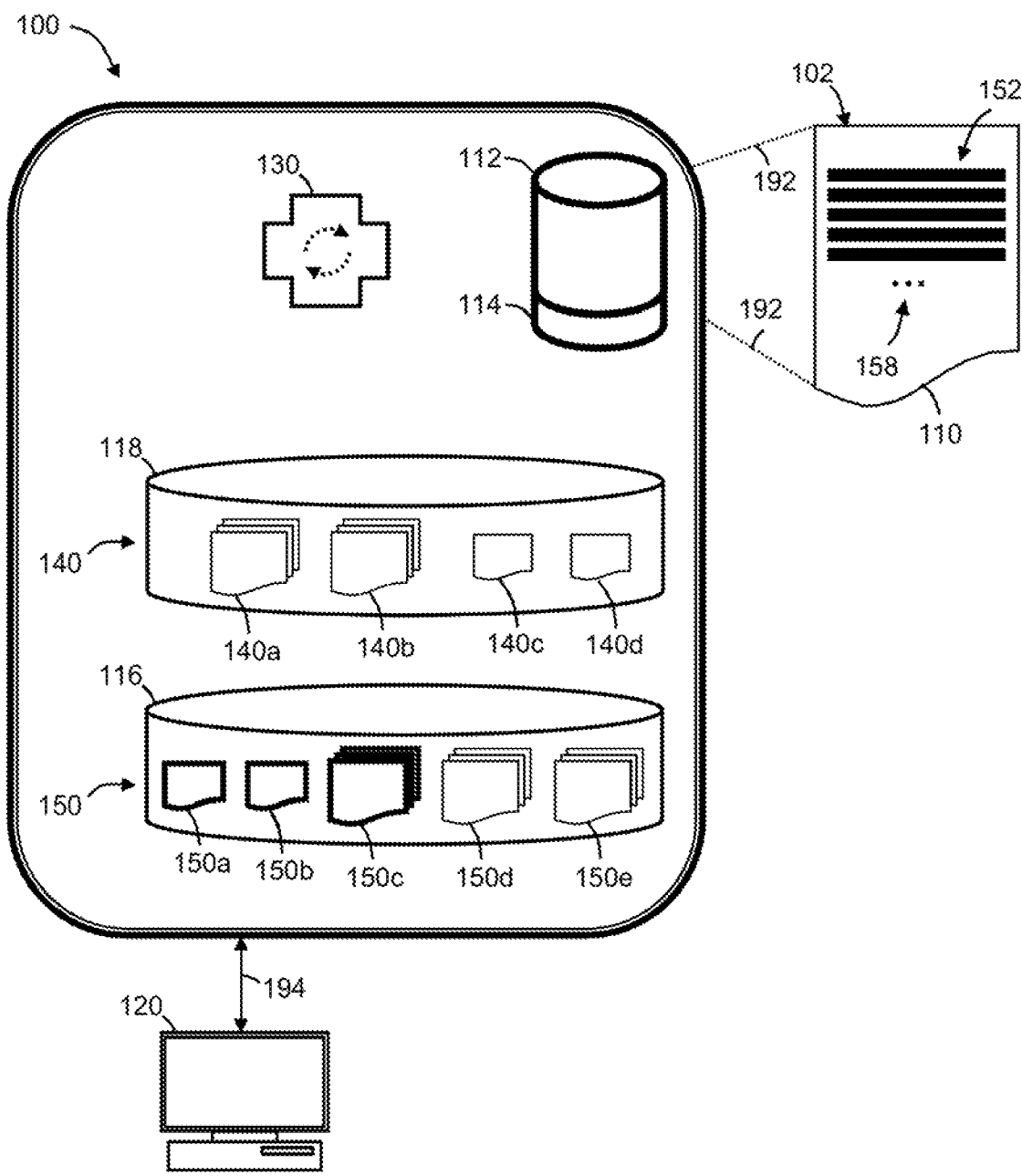

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 1B:
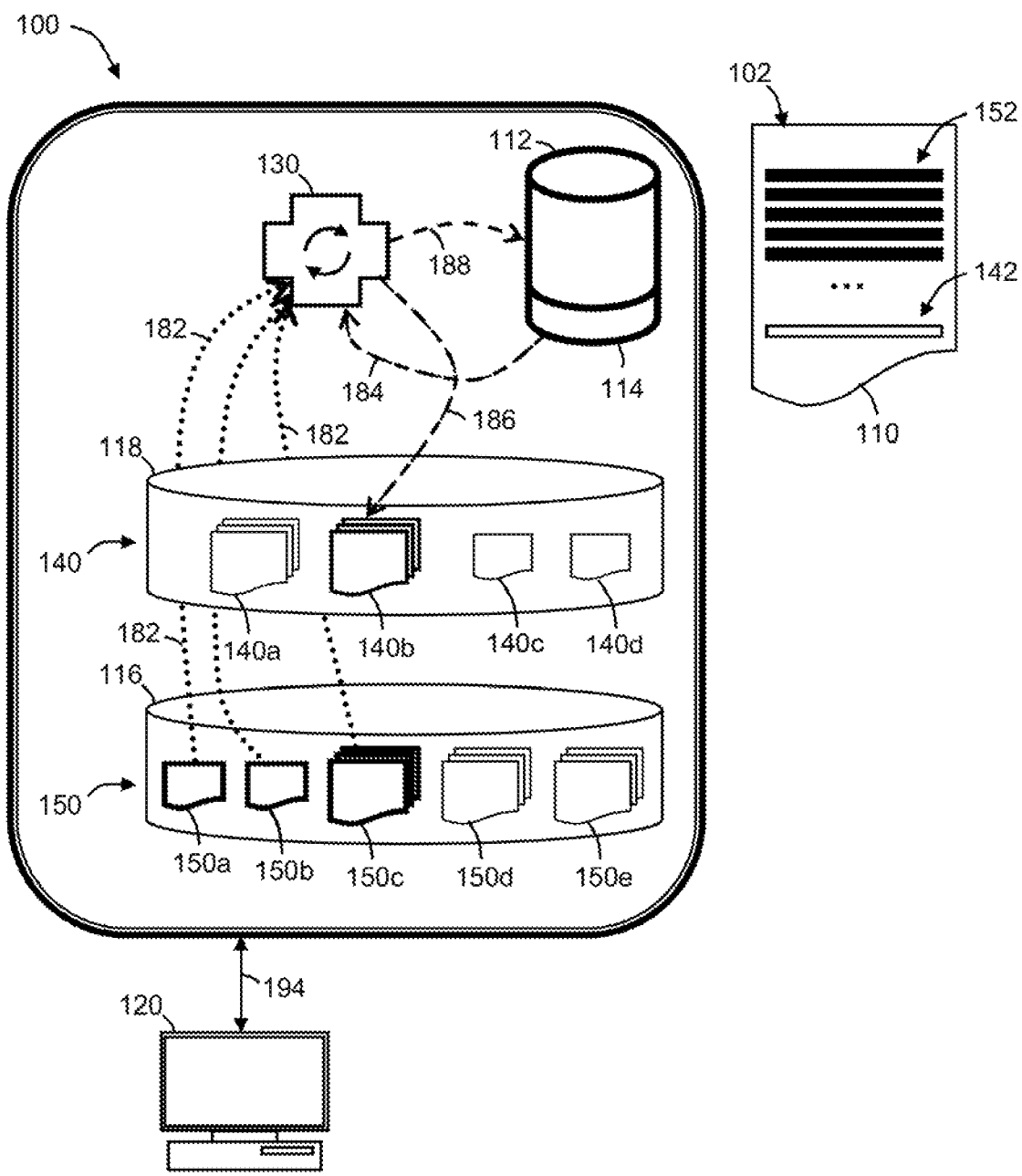
Figure 2A:
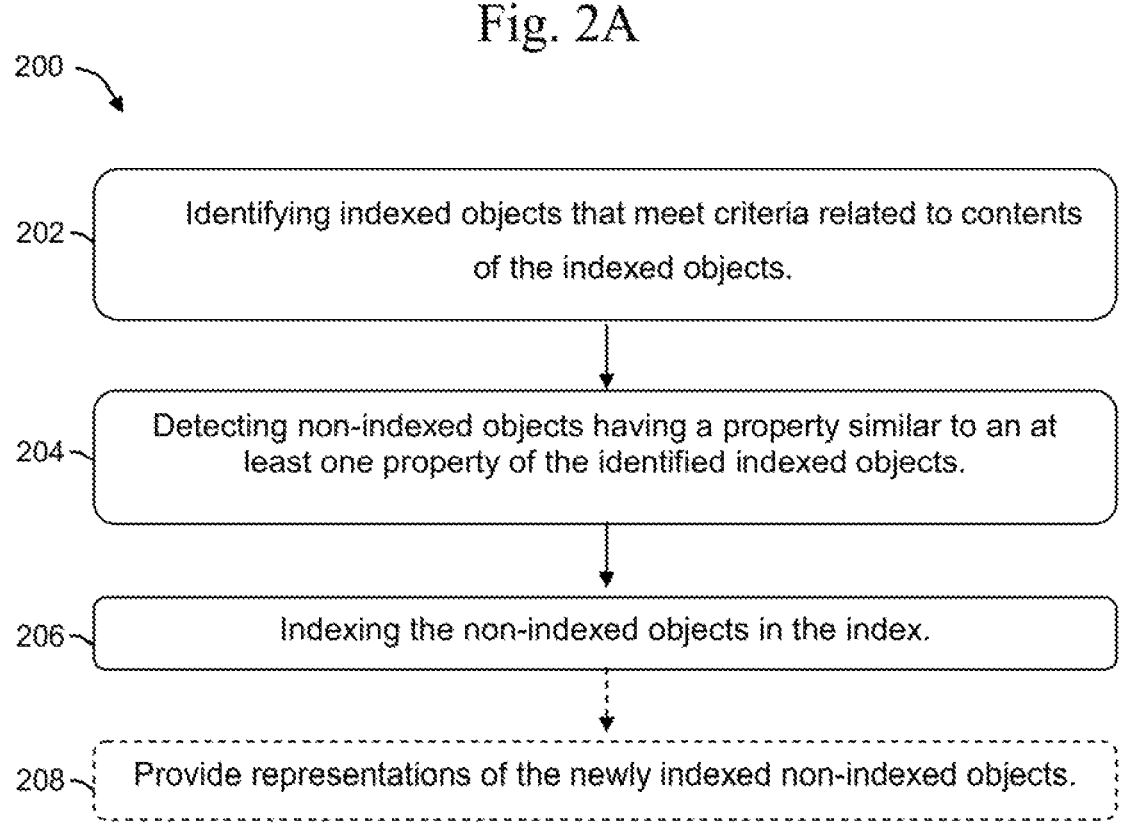
Figure 2B:
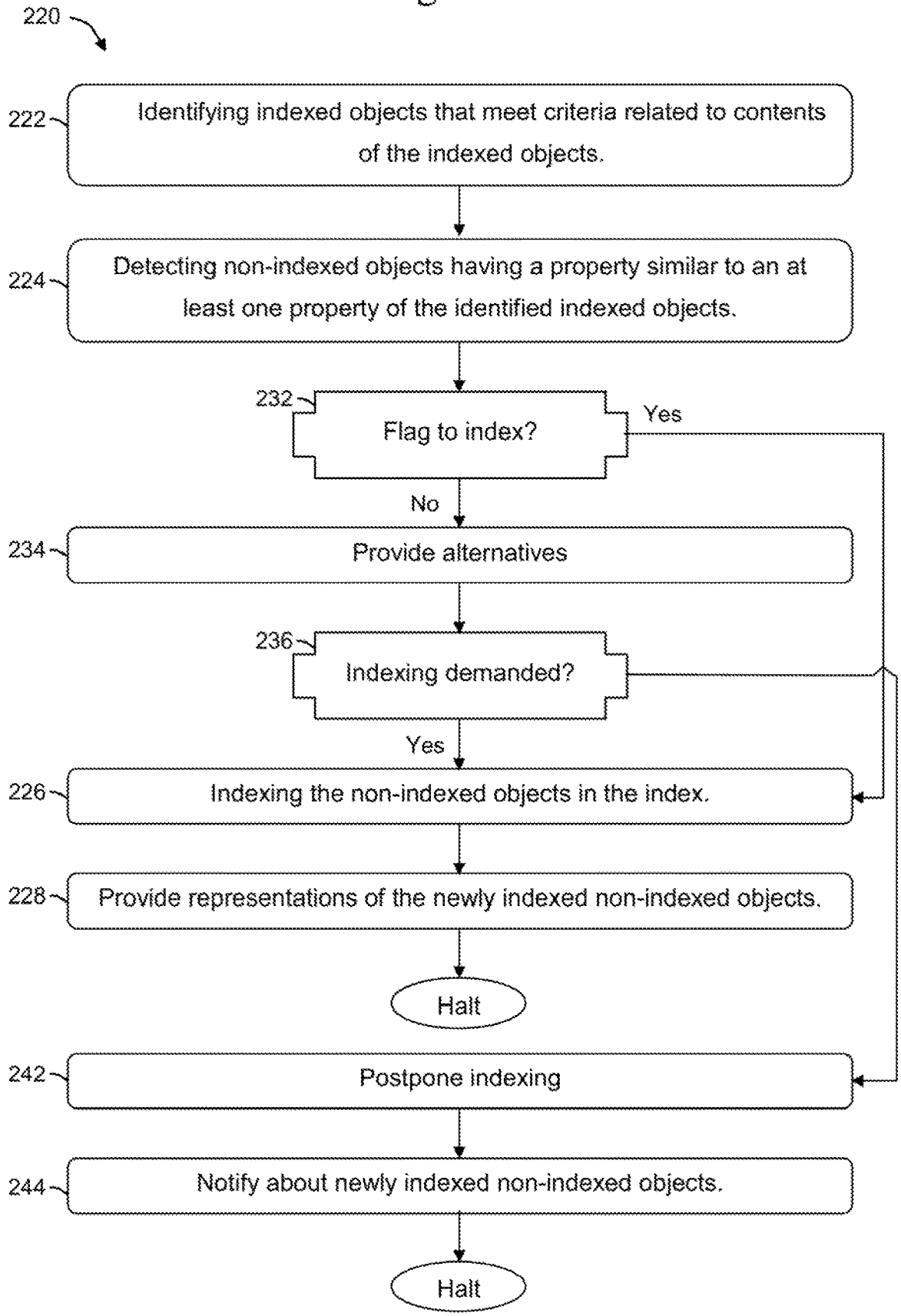

FIG. 1A schematically illustrates a portion of an enterprise with indexed and non-indexed objects, according to exemplary embodiments of the disclosed subject matter;

FIG. 1B schematically illustrates a portion of an enterprise with indexed and non-indexed objects where at least one of the non-indexed objects is indexed based on properties of the indexed objects, according to exemplary embodiments of the disclosed subject matter;

FIG. 2A outlines operations in indexing non-index objects in a computerized system having an index, according to exemplary embodiments of the disclosed subject matter; and FIG. 2B further outlines operations in indexing non-index objects in a computerized system having an index, according to exemplary embodiments of the disclosed subject matter.

DETAILED DESCRIPTION

In the context of the present disclosure, without limiting, the term 'enterprise' implies a computerized system comprising a plurality of computers communicating therebetween and having and/or sharing and/or communicating with a data storage device. The enterprise is also referred to as a 'computerized system' and the data storage device also referred to as 'data storage' or 'storage'.

For brevity, referring to an operation of the enterprise, such as sending of data, implies an operation of one or more components and/or computers of the enterprise.

Generally, without limiting, an enterprise comprises several computers in a range between about 10 computers and about 1000 computers or more. Optionally, an enterprise comprises less than 10 computers, not precluding having one computer as, for example, a mainframe computer.

In the context of the present disclosure, without limiting, the term 'object' implies a data element of the enterprise, such as a document, a file, an email, share point list, or a database and/or a construct that contains or associated with other objects, such as a folder or a directory.

In the context of the present disclosure, without limiting, the term 'property' of an object implies a feature or aspect of and/or respective and/or corresponding to an object. For example, a name, an address in a storage device and/or a link to a network storage device, an ownership, an access history of an object, an access permissions to an object, a classification, or an attribute of an object such as set or maintained by an operating system such as creation date and time of an object, entity or person creating and/or amending an object, size of an object, type of an object, tags with information about an object, and so forth, Accordingly, properties of an object comprise one or more property of an object, and likewise, an object corresponds to the properties thereof.

In some cases or embodiments, without limiting, referring to properties of an object implies referring to part of the properties and/or to a property of the object. For brevity, according to the context, referring to properties implies properties of an object and/or objects.

In the context of the present disclosure, without limiting, the term 'index' implies a construct such as an inventory or a catalog having data or information of and/or about objects by contents thereof, where data or information about an object is constructed in an entry of the index, generally an entry per object, such that entries correspond or are respective to objects and vise versa.

By way of a figurative example, an index may resemble a collection of cards or records of a book library, where each card or record, akin to an entry of an index, comprises information about the book in the library such as title, authors, publisher, code, summary of contents, keywords, classification, shelf location, borrowing restrictions or allowances, borrowing and returns histories and so forth.

In the context of the present disclosure, without limiting, the term 'indexing' or index operation imply compiling and constructing data or information about and/or of objects in an index.

Generally and without limiting, an index comprises elements of the contents of objects, such as keywords and/or phrases and/or extracts and/or citations and/or excerpts from the objects and/or derivations thereof such as stems, and at least optionally information about the locations of the elements in the objects. In some embodiments, the index comprises properties of objects or, alternatively, the properties are separately stored and maintained.

It is noted that the index of an enterprise may not be complete and/or sufficiently complete, such as due to the sheer number of objects and ongoing alterations thereof during the activity in the enterprise.

For brevity, properties having one or more common elements and/or similar elements and/or other relationships therebetween are referred to as similar properties and/or as related properties, and objects respective or corresponding to similar properties are referred to as similar objects and/or as related objects.

In the context of the present disclosure, without limiting, the term 'indexing server' denotes one or more data processing apparatuses configured to index content of objects of the enterprise and to maintain the index. In some embodiments, the indexing server is configured to store the properties of the objects in one or more storage devices such as in a database where, optionally, the database comprises an index or a part thereof.

In the context of the present disclosure, without limiting, the term 'client computer' refers to a computer and/or a computerized device such a smartphone or tablet computer, linked and/or linkable to the enterprise such as to a component of the enterprise by a communication facility or facilities, such as by a network and/or the internet or wireless or mobile communication or any combination of communications. Generally, the client computer is configured for data transfers and/or exchange with the enterprise and/or a component thereof. Thus, generally and without limiting, at least as data or objects of a client computer are concerned, a client computer is regarded or considered as a part of the enterprise, though not necessarily a physical part thereof, optionally temporarily or for a certain time.

In the context of the present disclosure, without limiting, the term 'connect' or 'link' implies either directed communication connection and/or indirect communication such as via a network and/or interconnections of components.

In some embodiments, without limiting, a client computer is operated and/or controlled by a human operator which is also referred to a user. In some embodiments, referring to an operation of a client computer implies an operation controlled by a human operator of the client computer.

In the context of the present disclosure, without limiting, referring to a client computer being on-line and off-line with respect an enterprise implies that the client computer is linked or not linked to the enterprise, respectively.

The terms cited above denote also inflections and conjugates thereof.

Generally, plenty of objects reside in and/or are linked to the enterprise and are accessible by numerous operators and computers, and the objects are subject to various modifications, including creations and deletions.

Indexing of objects in an enterprise requires computational resources and time for collecting and structuring properties of objects, including exploring inside the objects to identify and extract elements of the contents of the objects, and subsequently index the content of the objects. Thus, considering the ceaselessly varying objects, the indexing of objects in the enterprise may lag behind, leaving objects that are not yet indexed and/or having incomplete or insufficient index information.

One technical problem dealt by the disclosed subject matter is extending a search for objects in an enterprise with objects of the enterprise that may be related or relevant to the searched objects and are not yet indexed or not sufficiently indexed.

One technical solution according to the disclosed subject matter is configuring the indexing server to further look for and identify in the enterprise objects related to those discovered in a search which were not indexed or are not sufficiently indexed. The indexing server is further configured to index the identified objects and provide references to the identified objects, thereby extending the search with related objects by post-search indexing.

In one course of action the indexing server promotes the priority for identifying and indexing the related objects relative to other activities, thereby extending the search, at least partially, within a suitable practical time.

In another course of action, the indexing server schedules or assigns an activity, such as a task, with sufficient priority for subsequently identifying and indexing the related objects and notifying, optionally progressively, optionally with references to the identified objects and/or their whereabouts. Alternatively, a selection of the courses of actions is presented, enabling a requesting or demanding one or more of the courses of actions.

The courses of actions are either preset or determined based on an indication in the search, or particularly requested before and/or after the search.

In some embodiments, the search is carried out in the enterprise by a client computer operated by a user requesting a search akin to or resembling a Google search (Google Inc.) or a Yahoo search (Yahoo! Inc.).

Accordingly the indexing server provides the client computer with the search results along with at least some of the extended search results, and/or notifies the client computer, such as by email or SMS, with or about the extended search results and/or that search results are available and/or their whereabouts and/or with representations thereof. Alternatively, a selection of the courses of actions is presented to the user, offering the user to request or demand one or more of the courses of actions.

It is noted that referring to the indexing server does not necessarily imply the indexing sever per se but, rather, a component or components of the enterprise operating on behalf thereof and/or one or more processes operating with and/or for the indexing server. Likewise, the interaction with the client computer is not necessarily carried out by the indexing server.

A potential technical effect of the disclosed subject matter is an enterprise providing references to related objects of the enterprise that are practically not accessible due to missing information thereof.

A general non-limiting overview of practicing the present disclosure is presented below. The overview outlines exemplary practice of embodiments of the present disclosure, providing a constructive basis for variant and/or alternative and/or divergent embodiments.

A computerized system, such as an enterprise, stores and/or is linked to an abundant number of objects which change and/or are created and/or deleted in the course of the operation of the computerized system. One or more components of the computerized system, such as an indexing server, execute in the course of the operation of the computerized system to index the objects by contents thereof, but may not cope with the number of the objects and variations thereof.

One or more components of the computerized system, such as the indexing server, keep track of properties of the objects, at least partially, and stores them in an index of the computerized system and/or separately such as in a separate database.

Generally, collecting and storing properties of objects is much simpler and faster than inspecting and extracting contents of objects, and, thus, properties of objects are available while sufficient indexing of objects is not.

In case a search for objects by certain criteria based on contents thereof is conducted in the computerized system, some objects that were indexed may be found or identified based on the index, but other objects that potentially meet and/or are related to the criteria may not be found since the other objects are not yet indexed and/or insufficiently indexed.

In order to broaden the search for potential matches, however, the computerized system initiates indexing of objects having properties similar and/or related to the properties the of objects found or identified. Consequently, based on the indexing, resumes and/or re-start the search to provide further results.

A rationale for such broadening of the search is a presumption or a conjecture that objects having similar properties are likely, at least to some extent, to meet the search criteria.

Based on an analogous rationale, in some embodiments, the search is further broadened by including in the results also objects having properties similar and/or related to the properties of the objects found or identified objects, optionally only objects having a determined sufficient similarity to the properties the of objects found or identified objects.

In some embodiments, the indexing of objects having properties similar and/or related to the properties of the objects found or identified is initiated by one or more processes operative with and/or on behalf of an index and/or indexing server of the computerized system. In some embodiments, the one or more processes are operative in providing the results also objects having properties similar and/or related to the properties of the objects found or identified objects.

For brevity, the one or more processes are collectively referred to as an engine. The engine is operative on one or more component of the computerized system or, optionally or additionally, on a computerized apparatus linked with a component of the computerized system.

Principally, without limiting, the engine is constructed to operate with any index that provides for interacting therewith, such as by APIs (Application Programming Interface), SQL (Structured Query Language) commands, and/or any other method such as programmed events. Accordingly, the index is not necessarily proprietary to the computerized system.

FIG. 1A schematically illustrates a portion of an enterprise 100 with indexed and non-indexed objects, according to exemplary embodiments of the disclosed subject matter.

Enterprise 100 comprises an index-storage 112 that stores and maintains an index 110 of objects of enterprise 100, as illustrated by dotted lines 192 extending from index-storage 112. Index 110 comprises entries 102 respective or corresponding to objects of enterprise 100. Enterprise 100 also comprises a properties-storage 114 that stores and maintains properties of objects of enterprise 100 in a construct such as a list and/or a catalog and/or database, for brevity referred to as a properties-catalog (not shown).

It is noted that, generally, unlike indexing of objects of enterprise 100 by contents thereof, the properties are tracked and cataloged throughout enterprise 100 practically immediately and/or within a sufficiently short time responsive to alteration of creation or deletion of objects. For example, as an object is created or altered an event is generated and responsively the properties of the object, at least partially, are cataloged. Thus, the properties-catalog is practically up-to-date during the operation of enterprise 100.

Storages of enterprise 100 that store or contain objects of enterprise 100 are schematically illustrated as storage 118 and storage 116. Storage 116 contains objects that are already indexed as represented by objects 150 and exemplified by a series of object 150a to object 150e, and having corresponding entries 152 in index 110 as part of entries 102. On the other hand, storage 118 contains non-indexed objects, that is, objects that are not yet indexed, as represented by objects 140 and exemplified by a series of object 140a to object 140d. Dots 158 represent entries of other objects that are, at least possibly, indexed.

Generally, objects 140 and objects 150 represent various objects. For example, individual and/or separate and/or simple and/or basic objects such as exemplified by object 140c or object 150a, and/or complex or compound objects as folders or directories or binders as exemplified by object 140a or 150c.

Enterprise 100 further comprises an engine 130 comprising an at least one program for performing tasks related to indexing of objects that are not yet indexed, as described below such as with respect to FIG. 1B.

By way of example, a client computer 120 linked to enterprise 100, as schematically indicated by an arrow 194, conducts a search for objects of enterprise 100 according to some criteria, such as a condition or conditions related to contents of the objects. The search conducted by client computer 120 is also referred to as an original search.

Responsively, enterprise 100, such as by a component thereof, looks up index 110 and by entries 152 identifies objects that meet the search criteria. By way of example, object 150a, object 150b and object 150c are identified, as schematically illustrated by the bulky outlines thereof. Generally, without limiting, client computer 120 is notified about the identified objects, such as by providing links and/or representations of the identified objects to client computer 120.

As enterprise 100 comprises objects beyond those already indexed, it is likely that other objects that are not yet indexed may meet the search criteria, at least partly. As the number of objects that are not yet indexed is generally exceedingly large it is prohibitory to wholly access and index the non-indexed objects. Yet, it is reasonably probable that non-indexed objects having similar and/or shared properties with the identified objects might meet the search criteria, at least partly, and thus are candidates for indexing and expanding the search.

FIG. 1B schematically illustrates a portion of enterprise 100 with objects 150 as indexed objects and objects 140 as non-indexed objects, where one or more of objects 140 are indexed based on properties of objects 150, according to exemplary embodiments of the disclosed subject matter.

Engine 130 is activated, as indicated schematically by the full-line arrows as opposed to the dotted-line arrows of FIG. 1A where engine 130 is, at least possibly and/or in some embodiments, is not operative or is 'idle'.

In some embodiments, engine 130 detects and/or obtains the properties of the identified objects as exemplified by object 150*a*, object 150*b* and object 150*c*, as indicated schematically by dotted arrows 182. Subsequently, engine 130 identifies and/or determines in the properties-catalog properties related or similar to the identified objects, as indicated schematically by a dashed arrow 184, and the corresponding object or objects thereof such as by using the address and/or URL of the corresponding object or objects.

By way of example, the similar or related properties correspond to object 140*b*, which represents also possibly other non-indexed objects to which the similar or related properties correspond.

Consequently, object 140*b* is accessed by engine 130, as indicated schematically by a dashed arrow 186, and is indexed by engine 130 in index 110, as indicated schematically by a dashed arrow 188 and corresponding entry 142 as a part of entries 102. In a case where object 140*b* does indeed meet the search criteria as judged by entry 142 and/or as determined by engine 130, the search is extended by object 140*b* as an additional result and client computer 120 is notified about object 140*b* such as by a representation thereof, thereby extending the search conducted by client computer 120.

In some embodiments, in order to expedite the extension of the search as described above, operation of engine 130 is assigned a sufficient high priority relative to other processes or operations taking place in enterprise 100. Thus, a user operating client computer 120 receives the extended results sufficiently fast. For example, just after the notification and/or representations of the identified indexed objects and within a sufficiently negligible lapse so that additional result appear as part of the original search results. Optionally, in some embodiments, such as in a case where engine 130 cannot provide the additional results within a sufficient short period, client computer 120 is notified that further results are expected.

Alternatively, in some embodiments, after engine 130 identifies and/or determines in the properties-catalog properties related to or similar to the identified objects, client computer 120 is notified with a message prompting the user operating client computer 120 to select a subsequent procedure. In some embodiments, the prompting is to either (a) to proceed with indexing of object 140*b*, optionally with sufficiently high priority, or (b) to postpone the indexing and extension of the search, such as to schedule the indexing to operate in a regular or lower priority relative to other processes taking place in enterprise 100.

In case the user selects to proceed with indexing, engine 130 indexes object 140*b* in index 110, and if object 140*b* does indeed meet the search criteria as judged by entry 142 and/or as determined by engine 130, the search is extended by object 140*b* and client computer 120 is notified about object 140*b*, thereby extending the search thereof.

In case the user selects to postpone the indexing and extension of the search, engine 130 is assigned a task of subsequently accessing and indexing object 140*b* and determination whether object 140*b* does meet the search criteria. In a case where object 140*b* indeed meets the search criteria, then client computer 120 and/or the user is notified accordingly, for example, by an email or SMS or any other technique such as instant messaging.

In some embodiments, client computer 120 and/or the user is notified of and/or provided with a representation of object 140*b* even if object 140*b* does not meet or does not necessarily meet the search criteria, optionally with an indication to that effect. A possible or a potential rationalization of extending the original search by similar objects that do not meet the search criteria is that they are related by properties thereof to the original search and the user may be interested to examine them.

It is noted that, in some embodiments and without limiting, referring to a sufficiently fast time and/or sufficiently negligible lapse of time and/or a practical time and/or a period to that effect implies a period of less that 5 seconds, such as 4 seconds or 2 seconds or 1 second, also referred to also as real-time.

It is noted again that object 140*b* exemplifies a non-indexed object but also, at least possibly, represents or exemplifies a plurality of non-indexed objects. Thus, in some embodiments, engine 130 notifies client computer 120 and/or the user about additional results after the process of indexing and determination of matching the criteria is exhausted. Optionally or alternatively, engine 130 progressively notifies client computer 120 and/or the user as objects such as object 140*b* are indexed and determined to match the search criteria, for example, by a series of emails or SMS.

It is noted also that by postponing the indexing and extension of the search the load on enterprise 100 is reduced and/or more appropriately balanced relatively to completing the process in high priority.

Thus, the user can demand further indexing of related objects with similar properties as of identified or found objects that are already indexed, thereby allowing the user the discretion or judgment to demand the manner and/or situation by which the related objects are indexed.

Further, in some embodiments, the user is allowed and/or permitted to demand or select that one or more non-indexed related objects are to be indexed and presented sufficiently fast, if possible, and to postpone the indexing of the rest of the non-indexed related objects so the user is notified later on. For example, the user may be notified either exhaustively or progressively, such as by one email or a series of emails, respectively.

In some embodiments, when a non-index object or objects that partially match the search criteria are found, such objects may be used as a basis for further indexing and determination of partially meeting the search criteria based on the properties thereof as descried above.

In some embodiments, the behavior of enterprise 100 such as by engine 130 with respect to non-indexed objects, such as whether to proceed with indexing of the non-indexed objects or whether to provide the user with an option to demand immediate indexing of the non-indexed objects or whether to notify about similar objects that do not meet the criteria, are dictated and/or determined by a preset and/or pre-defined and/or a provided indication or a setting such a code or a flag, collectively referred to also as a flag. For example, enterprise 100 and/or engine 130 are pre-configured to operate according to a preset indication, or a user provides an indication along with and/or within the search criteria.

Some variations and clarifications according to the present disclosure with respect to enterprise 100 and/or components and/or operation thereof are presented below.

In some embodiments, a non-indexed object is and/or may be an insufficiently indexed object. For example, an object that was previously indexed but the contents thereof were later altered and the alteration of the contents is not yet indexed, or, for example, an object being indexed.

In some embodiments, client computer 120 represent a plurality of client computers that conduct searches in enterprise 100 either simultaneously and/or sequentially.

Generally, without limiting, engine 130 operates as one or more processes, optionally as concurrent processes.

In some embodiments, engine 130 is comprised in one or more computers or processors. In some embodiments, engine 130 is not a part of enterprise 100 but, rather, a component, such as a separate computer, linked to enterprise 100. Optionally, in some embodiments, engine 130 is comprised in an indexing server of enterprise 100.

In some embodiments, operations ascribed to engine 130 are carried out with one or more components of enterprise 100, such as an indexing server of enterprise 100, optionally with cooperation with engine 130.

In some embodiments, index 110 is a generalized construct enabled to for additions, alterations and deletion of entries such as entries 102. For example, index 110 provides one or more interfaces such as APIs enabling operation in and/or on index 110. Likewise, in some embodiments, engine 130 is constructed as configured to operate on index 110 according to the one or more interfaces thereof.

In some embodiments, index-storage 112 and index 110 are not a part of enterprise 100 but, rather, a component, such as a separate storage device, linked to enterprise 100.

In some embodiments, enterprise 100 determines, such as by engine 130 and/or another component, whether it is plausible to provide additional results in real-time, for example, based on the number of objects and/or activity in enterprise 100. Accordingly, the user is notified to that effect and may opt for postponing the indexing of related objects or demand the indexing regardless of the time required.

In some embodiments, the search for objects of enterprise 100 is according to one criterion or a condition, and, thus, referring to criteria or conditions does not preclude one criterion or one condition.

In some embodiments, results of a search for objects, either of an original search and/or of an extended search, constitute and/or comprise any one of links to the objects, or any form of a representation such as a URL of the objects, where referring to objects does not preclude on object.

Exemplary similar and/or related property of an object comprises, without limiting, any one of a common owner, a common access permission, a common classification, and/or other relations such as a common person that accessed the object.

Referring to a storage implies one or more storage devices. For example, index-storage 112 may be implemented in one or more devices.

In some embodiments, index-storage 112 and properties-storage 114 are implemented in the same storage device or devices. Further, in some embodiments, the properties-catalog is implemented within and/or as a part of index 110.

Following below are two scenario that figuratively illustrates exemplary procedures according to the present disclosure.

Supposedly, in one scenario, that an organization has a human-resources department and an enterprise of the organization has a folder named \\organization\HR which is shared by suitable permissions with the members of the human-resources department that include Bob and Alice.

The human-resources department is a valuable one for the organization and the data in \\organization\HR is considered as critical. Therefore, the enterprise attends to duly update folder '\\organization\HR' and files thereof, such as by a sufficiently high priority process.

The organization also provides for members thereof to maintain personal data in a folder \\organization\home, and thus Alice keeps her private or personal data in files in a folder \\organization\home\Alice. The files of \\organization\home are considered as insignificant by the organization and, therefore, are not necessarily indexed in the enterprise or are only partly indexed, such as during an idle process.

At a certain time Alice coordinates with Bob to share her personal folder with him so that Bob is granted access permission to Alice's personal data. Consequently, Bob and Alice have access permissions both to \\organization\HR and \\organization\home\Alice and thus \\organization\HR and \\organization\home\Alice and files thereof are similar at least by the common access permissions.

At a certain time later on, Bob conducts a search in the enterprise by some criteria based on the index, thereby some files in \\organization\HR are found.

Subsequently, based on the similarity of files in \\organization\HR and \\organization\home\Alice as judged by the common access permissions, the enterprise notifies Bob about the similar files in \\organization\home\Alice, optionally prompting Bob to demand indexing of the non-indexed similar files in \\organization\home\Alice for possibly extending the search in a scheduled process and subsequently notifying Bob about the extended search findings.

Supposedly, in another scenario, that an organization has a department for stock market analysis in which Alice is a member as an analyst, and a department for trading stocks in which Bob is a member as a broker. The organization has an enterprise where in a folder \\organization\analysis are stored numerous Microsoft Excel files that are used for the analysis and where, respectively, in a folder \\organization\brokers are stored Microsoft Excel files that are used for trading, generally as based on selected files from \\organization\analysis.

The files in \\organization\analysis are of a transitory nature as algorithms and other analyses are frequently tested, and therefore are not necessarily indexed, at least not in high priority.

On the other hand, the files in \\organization\brokers are always indexed, such as to keep track of the trading.

The files in \\organization\analysis and \\organization\brokers are similar at least by the common type of the files therein, and by a common classification according to the general subject matter thereof. For example, the files are classified as Stocks, or possibly the files are classified by a general classification as Financial and by a supplementary and/or additional classification as Stocks.

Thus, when Bob conducts a search having, for example, criteria of share prices, files in \\organization\brokers are found based on the index having therein prices of stocks, possibly as and/or based on groups of cells in the Microsoft Excel files.

Subsequently, based on the similarity of files in \\organization\brokers and \\organization\analysis as judged by the common files types and/or classification, the enterprise notifies Bob about the similar files in \\organization\analysis, for example, in Alice's folder \\organization\analysis\Alice, and optionally prompts Bob to demand indexing of the non-indexed similar files in \\organization\analysis\Alice for promptly extending the search.

In view of the descriptions above, enterprise 100 is configured generally and without limiting to perform the following exemplary of operations.

Responsive to a user-driven search executed on enterprise 100, based on index 110 enterprise 100 finds objects on parts of enterprise 100 that are already indexed as results of the user-driven search.

Engine 130 looks at the properties of the results of the user-driven search, and finds other objects of enterprise 100 that were not yet indexed and having similar properties as the results of the user-driven search.

Responsive to a setting a pre-defined or provided with user-driven search, enterprise 100 either (a) or forces, such as by a high-priority process of engine 130, indexing of the non-indexed similar objects to extend the user-driven search by the similar objects sufficiently immediately, or in real-time, optionally responsive to a choice by the user demanding the indexing of the similar objects, or (b) postpones the indexing of the similar objects followed by a notification to the user.

In some embodiments, only non-indexed objects that meet or matches the criteria of the user-driven search as indexed.

Thus, the original user-driven search is extended by a post-search indexing of non-indexed objects.

FIG. 2A outlines operations 200 in indexing non-index objects in a computerized system having an index, according to exemplary embodiments of the disclosed subject matter.

In operation 202 indexed objects that meet criteria related to contents of the indexed objects are identified. The identification is based on the index of the computerized system which stores and maintains entries based on the contents of the indexed objects.

Generally, without limiting, the criteria are provided by a user, such as in query and/or a search for objects of the computerized system that is conducted by the user, for instance, via a computer linked to the computerized system.

In operation 204 non-indexed objects having a property similar to an at least one property of the identified indexed objects are detected in the computerized system.

In operation 206 the non-indexed objects are indexed in the index.

In operation 208, at least optionally, representations of the newly indexed non-indexed objects are provided, for example, the representations are provided to the computer linked to the computerized system. Optionally or additionally, the representations are provided along with the representations of the identified indexed objects.

FIG. 2B further outlines operations 220 in indexing non-index objects in a computerized system having an index, according to exemplary embodiments of the disclosed subject matter.

Operation 222 and operation 224 are analogous to operations 204 and operation 206 of operations 200, respectively, and for brevity and clarity are not repeatedly or redundantly described.

In operation 232 it is checked whether there is a flag indicating to proceed with indexing of the non-indexed objects.

If true, operation 226 and operation 228 follow sequentially. Operation 226 and operation 228 are analogous to operations 206 and operation 208 of operations 200, respectively, and for brevity and clarity are not repeatedly or redundantly described.

If false, in operation 234 alternatives for subsequent activities provided. For example, the alternatives are provided to a user operating a computer linked to the computerized system.

In operation 236 it is checked whether an alternative to demand indexing of the non-indexed objects is chosen.

If true, operation 226 and operation 228 follow sequentially.

If false, in operation 242 indexing of the non-indexed objects is postponed, such as by scheduling the indexing for a subsequent or later processing or activity.

In operation 244 a notification is issued about the newly indexed non-indexed objects. For example, the representations of the newly indexed objects are provided to a user that conducted the search for objects of the computerized system or that posed a query for object of the computerized system.

It is noted that regarding operations 200 and/or operations 220 that referring to a plurality of items or entities does not preclude item and/or entity. For example, the indexed objects do not preclude one indexed object, or the non-indexed object do not preclude one non-indexed object, or the criteria do not preclude one criterion, or the properties do not preclude one property.

There is thus provided according to the present disclosure a method for indexing objects in a computerized system having an index, comprising identifying in the computerized system an at least one indexed object that meets an at least one criterion related to contents of the at least one indexed object, detecting an at least one non-indexed object having a property similar to an at least one property of the at least one indexed object that was identified, and indexing the at least one non-indexed object in the index, wherein the method is performed by the computerized system.

In some embodiments, the indexing is performed responsive to detecting the at least one non-indexed object.

In some embodiments, the indexing is scheduled to be performed subsequently to detecting the at least one non-indexed object.

In some embodiments, the at least one indexed object comprises a plurality of indexed object.

In some embodiments, the at least one criterion comprises a plurality of criteria.

In some embodiments, the at least one property comprises a plurality of properties.

There is thus further provided according to the present disclosure a method for a post-search indexing of objects in a computerized system having an index, comprising searching for indexed objects in the computerized system according to an at least one criterion received from a computer that is linked to the computerized system, identifying in the computerized system an at least one indexed object that meets the at least one criterion, detecting an at least one non-indexed object having a property similar an at least one property of the at least one indexed object, providing the computer with alternatives for choosing either to demand proceeding with indexing of the at least one non-indexed object or to postpone the indexing of the at least one non-indexed object, and receiving a choice from the computer, and according to the choice, performing either indexing of the at least one non-indexed object and providing the computer with a representation thereof, or scheduling for a subsequent indexing the at least one non-indexed object, wherein the method is performed by the computerized system.

In some embodiments, following the subsequent indexing a user of the computer is notified about the at least one non-indexed object that is subsequently indexed.

In some embodiments, the representation is provided only when the at least one non-indexed object that is subsequently indexed meets the at least one criterion.

In some embodiments, the computer is notified only when the at least one non-indexed object that is subsequently indexed meets the at least one criterion.

In some embodiments, one criterion relates to content of objects of the computerized system.

In some embodiments, the at least one criterion comprises a plurality of criteria.

There is thus yet further provided according to the present disclosure an apparatus for indexing objects in a computerized system, comprising an at least one computer, an at least one storage device constructed with an index for objects of the computerized system, wherein the at least one computer is constructed with a program configured for identifying in the computerized system an at least one indexed object that meets an at least one criterion related to contents of the at least one indexed object, detecting an at least one non-indexed object having a property similar an at least one property of the at least one indexed object, and indexing the at least one non-indexed object in the index.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

We claim:

1. A system for post search indexing of objects in an enterprise network, comprising:
   an index storage configured to store and maintain an index of objects of the enterprise network based on the content of the objects;
   a properties storage configured to store and maintain properties of objects of the enterprise network; wherein properties of an object are configured to be updated immediately upon alteration, creation or deletion of the object;
   a computerized engine that executes a program configured to:
      search at a request of a user for indexed objects in the enterprise network according to a criterion related to the contents of the indexed objects;
      identify an indexed object that meet the criterion;
      detect one or more non-indexed objects in the enterprise network having a property similar to a property of the identified indexed object;
      determine if the non-indexed objects should be indexed with a high priority and searched so that additional results will appear to be part of the original search or notify the user that further results will be provided later.

2. The system of claim 1, wherein the determining is performed by the user setting a preset indication.

3. The system of claim 1, wherein the determining is performed by notifying a user regarding the detected non-indexed object; and receiving a selection from the user if to proceed to index the non-indexed object with high priority or to index the non-indexed object at regular priority.

4. The system of claim 3, wherein the received selection selects some of the non-indexed objects to be indexed immediately and some to be postponed.

5. The system of claim 1, wherein results provided later are provide by sending an SMS, instant messaging or sending an Email.

6. The system of claim 1, wherein results provided later are provided after processing all the non-indexed objects.

7. The system of claim 1, wherein results provided later are provided progressively as they are produced.

8. A method for post search indexing of objects in an enterprise network, comprising:
   searching at a request of a user of a computerized engine in the enterprise network for indexed objects in an index storage of the enterprise network according to a criterion related to the contents of the indexed objects; wherein the index storage is configured to store and maintain an index of objects of the enterprise network based on the content of the objects;
   identifying an indexed object that meet the criterion;
   detecting one or more non-indexed objects in the enterprise network having a property similar to a property of the identified indexed object; wherein the enterprise network is configured to store and maintain properties of objects of the enterprise network in a properties storage and wherein properties of an object are configured to be updated immediately upon alteration, creation or deletion of the object;
   determining if the non-indexed objects should be indexed with a high priority and searched so that additional results will appear to be part of the original search or notify the user that further results will be provided later.

9. The method of claim 8, wherein the determining is performed by the user setting a preset indication.

10. The method of claim 8, wherein the determining is performed by notifying a user regarding the detected non-indexed object; and receiving a selection from the user if to proceed to index the non-indexed object with high priority or to index the non-indexed object at regular priority.

11. The method of claim 10, wherein the received selection selects some of the non-indexed objects to be indexed immediately and some to be postponed.

12. The method of claim 8, wherein results provided later are provide by sending an SMS, instant messaging or sending an Email.

13. The method of claim 8, wherein results provided later are provided after processing all the non-indexed objects.

14. The method of claim 8, wherein results provided later are provided progressively as they are produced.

* * * * *